US012589887B2

(12) United States Patent
Crocker

(10) Patent No.: US 12,589,887 B2
(45) Date of Patent: Mar. 31, 2026

(54) GPS DIRECTED ULTRA-HIGH PRESSURE RUNWAY CLEANER

(71) Applicant: Federal Signal Corporation, Downers Grove, IL (US)

(72) Inventor: James P. Crocker, Stuart, FL (US)

(73) Assignee: FEDERAL SIGNAL CORPORATION, Downers Grove, IL (US)

( * ) Notice: Subject to any disclaimer, the term of this patent is extended or adjusted under 35 U.S.C. 154(b) by 40 days.

(21) Appl. No.: 18/538,060

(22) Filed: Dec. 13, 2023

(65) Prior Publication Data

US 2024/0190585 A1 Jun. 13, 2024

Related U.S. Application Data

(60) Provisional application No. 63/387,112, filed on Dec. 13, 2022.

(51) Int. Cl.
*B64F 1/36* (2024.01)
*G05D 1/248* (2024.01)
*G05D 1/648* (2024.01)
G05D 105/10 (2024.01)
G05D 107/80 (2024.01)

(52) U.S. Cl.
CPC .............. *B64F 1/36* (2013.01); *G05D 1/248* (2024.01); *G05D 1/648* (2024.01); *G05D 2105/10* (2024.01); *G05D 2107/85* (2024.01)

(58) Field of Classification Search
None
See application file for complete search history.

(56) References Cited

U.S. PATENT DOCUMENTS

| | | | | |
|---|---|---|---|---|
| 5,228,623 A | * | 7/1993 | Raghavan | B08B 3/024 |
| | | | | 285/24 |
| 2009/0323046 A1 | * | 12/2009 | Tan | E01H 1/00 |
| | | | | 342/357.48 |
| 2014/0263691 A1 | * | 9/2014 | Rarick | B05B 13/005 |
| | | | | 239/1 |
| 2020/0114918 A1 | * | 4/2020 | Crocker | B60T 17/22 |
| 2021/0278860 A1 | | 9/2021 | McGee et al. | |
| 2022/0101271 A1 | | 3/2022 | Steine | |
| 2022/0265110 A1 | * | 8/2022 | Molina Cabrera | |
| | | | | A47L 11/4066 |

FOREIGN PATENT DOCUMENTS

CN 209353276 9/2019

OTHER PUBLICATIONS

Parker et al., "Live Detection of Foreign Object Debris on Runways Detection using Drones and AI", 2022 IEEE Aerospace Conference (AERO), Mar. 5, 2022, pp. 1-13 (Year: 2022).*

* cited by examiner

*Primary Examiner* — Tamara L Weber
(74) *Attorney, Agent, or Firm* — Merchant & Gould P.C.

(57) ABSTRACT

A GPS directed vehicle for cleaning airport runway surfaces. The vehicle uses an ultra-high pressure washer for cleaning rubber off the surfaces of the runway, and a vacuum system for the collection of debris. A GPS device allows an operator to track a cleaning line so as to allow no more than 25 mm overlap of surfaces to be cleaned. An iPad can be used to highlight Google maps for calculating a runway area to be treated. Recording allows the exact location of last treated surface area to allow exact location of an untreated surface area.

9 Claims, 3 Drawing Sheets

GPS DIRECTED ULTRA-HIGH PRESSURE RUNWAY CLEANER

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 63/387,112, entitled "GPS DIRECTED ULTRA-HIGH PRESSURE RUNWAY CLEANER", filed Dec. 13, 2022. The contents of the above referenced application are incorporated herein by reference in its entirety.

FIELD OF THE INVENTION

The field of the invention is airport runway cleaning and, in particular, an airport runway cleaner using a GPS directed ultra-high pressure water cleaner capable to limit overlap cleaning of 25 mm or less.

BACKGROUND OF THE INVENTION

Maintaining an airport runway in optimum condition is a critical safety issue. Removing rubber from airfield runways has long been a challenge for airfield maintenance managers around the world. Rubber builds up from the rapid deceleration of landing aircraft which can coat the surfaces of grooved runways. Grooved runways are used to eliminate airplane hydroplaning. The buildup of rubber causes the runway to become slippery under wet conditions directly affecting the safety of landing airplanes and their passengers. The National Transportation Safety Board ruled the 2019 crash involving a Boeing 737 passenger jet was due to hydroplaning which caused the airplane to overrun the runway. Friction measuring devices are used to perpetually monitor the friction within the landing zones and remedial action is taken in accordance with the findings.

The removal of rubber from the runway surface is traditionally performed by chemical cleaning or high pressure water cleaning. Chemical cleaning requires the use of harsh, costly, and environmentally unfriendly chemicals that essentially melt the rubber from the runway surface before being washing away at low pressure. Busy airports are designed to run 24/7 sometimes leaving only minutes between plane landings for maintenance purposes. The chemical cleaning does not allow for rapid exit from the runway and requires tens of thousands of gallons of water and many pieces of equipment to agitate, flush and collect the caustic chemicals.

The Applicant is a pioneer company regarding the removal of rubber from runways using vehicle mounted ultra-high pressure water with vacuum recovery. Ultra-high pressure water is very effective in the removal of rubber and can be accomplished using a single vehicle with a single operator; the vehicle can vacate a runway quickly.

A problem with removing rubber is that most cleaning operations are scheduled to be performed when the runway is least active, mainly at night time. Removing black rubber in darkness is problematic, and the problem is enhanced if the runway is wet. In the dark with wet conditions makes it most difficult for the operator to distinguish what has been cleaned and what remains to be cleaned. In many instances, there are no good contrasting colors between the clean surface and the still-to-be-cleaned surface. The best case scenario is removing black rubber from whiteish concrete in the daytime but that is rarely the case. Secondly, in many instances, it is necessary to frequently vacate the airfield to allow for a landing aircraft to have safe passage without the interference of a vehicle on the runway. In the second instance, the first description of contrast also comes into play because now the operator must find where the last point of contact was throughout the course of a shift.

In the vast majority of airfields performing rubber removal operations around the world, closures range from 90 minutes to six hours. Still, other runways are so heavily used that operators are limited to less than 10 minutes of time between landings. In either event, the time between cycles demands that the operator know exactly where the cleaning operation last ended so as to resume with little or no over-cleaning. Improper maintenance carries a tremendous risk to runway damage if the runway is over-cleaned. The smaller the work windows, the more impossible it is for an operator to keep track of the area cleaned and what needs to be cleaned. Even the most experienced operators may clean an area multiple times when they should be cleaned only once. This reality is further insured when removal operations happen at night. Removing black rubber from a black asphalt surface at night is very difficult and water creates a further visual barrier that makes it even more difficult to see and keep track of what has been cleaned and what needs to be cleaned. Over-cleaning bare unprotected asphalt surfaces which can unnecessarily damage the runway and increase the possibility of unraveling and creating Foreign Object Damage (FOD).

These issues in combination present the risk of "over-cleaning" which can lead to the removal of the bitumen fines that hold the stones together and prevent unravelling. The aforementioned issues can also lead to under-cleaning which in turn leads to the failure of friction tests and results in needing to reclean the runway. Because it is impractical to test every exact landing path of each aircraft, it is also and lastly possible to have remaining friction issues because of under-cleaning and the under-cleaned area simply did not get tested by a friction testing vehicle that is in many cases, has a wheel width of less than 1 meter in width.

SUMMARY OF THE INVENTION

Disclosed is a GPS directed vehicle having an ultra-high pressure washer for cleaning airport runway surfaces. The GPS device allows an operator to track a cleaning line so as to allow no more than 25 mm overlap of surfaces to be cleaned.

An objective of the invention is to teach the use of a device for efficiently removing rubber from runway surfaces to enhance runway surfaces to decrease hydroplaning and improve airplane passenger safety.

Another objective of the invention is to teach the use of a runway cleaning system that can optimize cleaning time by eliminating time overcleaning and damage to a runway by the removal of bitumen between the stones which can lead to the unraveling of the surface which presents obvious FOD and the obvious safety risks.

Still another objective of the invention is to disclose a GPS directed vehicle that can clean runway surfaces without overcleaning.

Still another objective of invention is to teach the use of an iPad or similar device that allows the operator of a mobile ultra-high pressure cleaner to interact with a GPS antenna and Google Earth or similar GPS program to map out an area to be cleaned and return to the point that cleaning last ended.

Yet it is still another objective of the invention to teach the use of a program that shades a screen map of runway surfaces that have been cleaned, and instructs a vehicle mounted controller where to resume runway cleaning.

Still another objective of the invention is to enhance operator control of a vehicle to assure efficiency.

Yet still another objective of the invention is to provide a GPS directed vehicle having an ultra-high pressure washer for only cleaning required runway surfaces to avoid damage to the runway and foreign object damage (FOD).

Another objective of the invention is to prevent under-cleaning which results in rubber left on the runway and the resulting lack of friction values.

Still another objective of the invention is to store prior cleanings so that a subsequent cleaning will begin removal at a slightly different position laterally so that the overlaps will not repeat themselves down the runway to further avoid over-cleaning.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE PREFERRED EMBODIMENT

Figure 1:
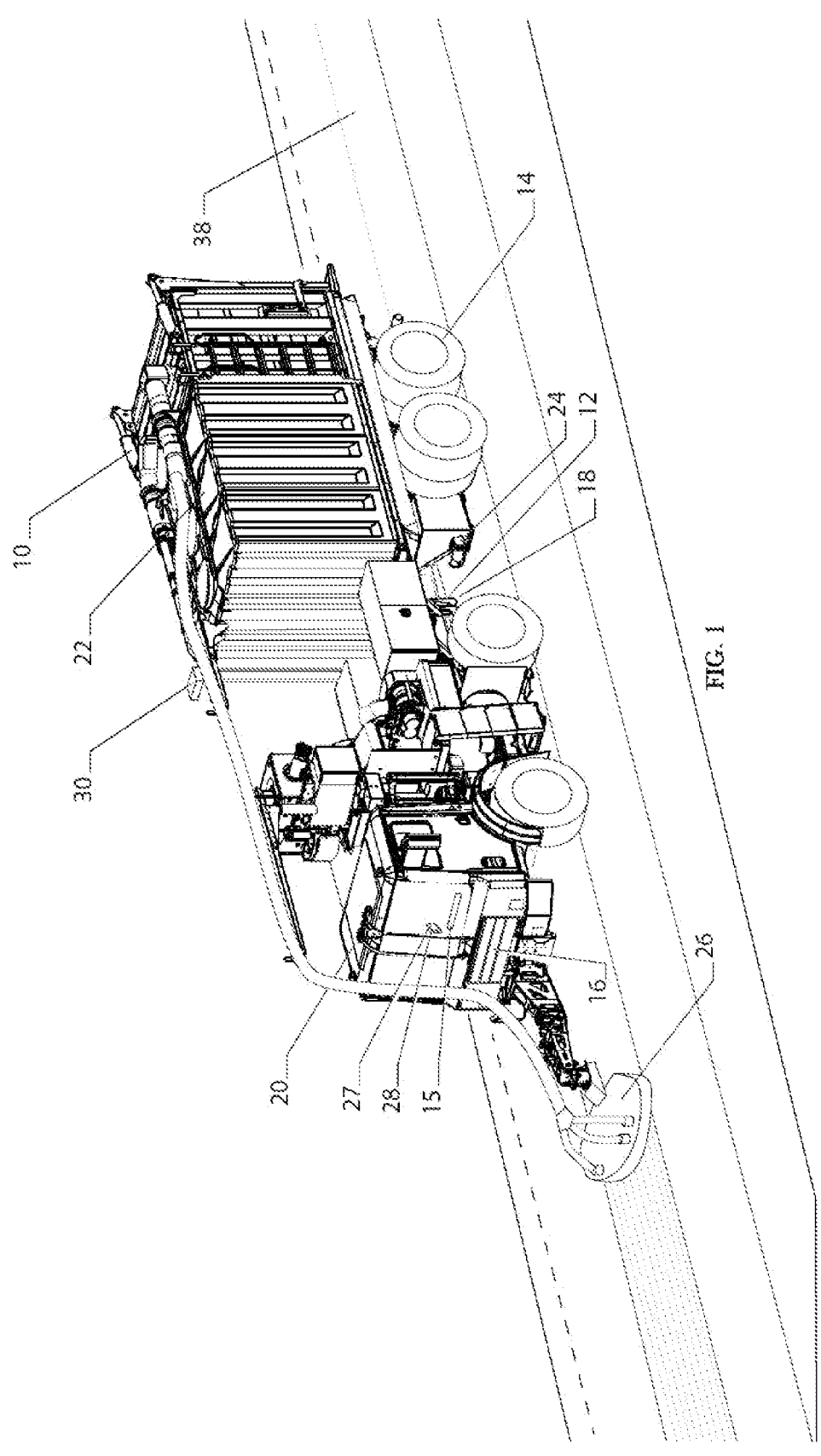
FIG. 1 is a perspective view of a GPS directed vehicle using circular pressure washers.

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

The present invention solves a number of these problems. This innovation involves the use of an iPad or similar touchscreen device that allows the operator an overhead view of the runway. Although the view is likely months or even years old, aircrafts land in the same place, the location does not change, and thus the presence of rubber on the airfield will be consistent with the overhead view from Google Earth or similar GPS program, no matter how old that view may be. The operator then outlines with his finger the limits of rubber removal the operator intends to complete in that particular shift. A GPS receiver sits on top of the cab and is calibrated so that it knows exactly where the blasting head sits in relation to the GPS receiver. In one embodiment the Trimble RTK positioning system provides accuracy to less than 2 centimeters using GNSS precision. A wheel equipped encoder is spring loaded against the steering wheel and coupled to an iPad or similar touchscreen to interface with the receiver. The iPad displaying the position of the blasting head and the associated posture of the tires that control the direction of the vehicle in motion. The operator controls the speed of the vehicle, but upon approaching the outlined area to be cleaned, the operator places the vehicle in automatic mode wherein the wheel equipped encoder steers straight down the first path. The touchscreen allows the operator to input the width of the blasting head to be used during the particular shift. The operator also inputs the number of millimeters or inches of overlap the operator would like to see as the vehicle traverses down the runway, the preferred overlap is about 25 mm.

As the operator traverses along the path of travel, there is shading that occurs on a recorded map that indicates completion of a pass. If the operator must leave in the middle of the pass, the software and touchpad will redirect the operator directly back to the exact position upon return. When the operator has completed with a pass, the operator takes over the steering manually and turns the truck around and positions it in rough proximity to the next pass. An auto feature re-engages the automatic steering and steers the vehicle down the runway with a 25 mm or less controlled overlap.

The cleaned area is stored in device wherein the next time the operator returns to that section of the runway, the operator will be equipped to begin the removal at a slightly different position laterally, maybe 50 or 75 mm away, so that the overlaps will not repeat themselves linearly down the runway which further minimizes any potential for over-cleaning and the associated risks.

It is well-known that overlapping an area too many times in the same exact location can lead to the removal of bitumen or cement from the surface and lead to the unraveling of the stones that comprise an asphalt or concrete runway. This condition, of course, can result in a very dangerous condition for landing aircraft or aircraft taking off and could suck up small stones known as FOD into the aircraft jet engines.

Any overlapping of blast patterns, effectively results in a small strip of asphalt being hit twice while the neighboring asphalt or cement is only hit once. To cover larger areas, a triple spray head places three spray bars, directly in line with each other, there is no offset. The spray bars pass approximately 3 mm from each other. The outside jets on each of the bars are angled slightly so that they completely cover the area but do not overlap each other. This is a "zero overlap solution" that effectively covers 48 inches, or nearly 1.3 meters with zero overlap. The use of the triple spray bar solution is that all three bars are rotated with one motor so it is impossible to spin them at different speeds.

The GPS guidance on the steering wheel of the vehicle not only autosteers the vehicle in order to create "controlled overlaps" to less than 25 mm, it also creates a color coded map showing prior passes so that if an operator must vacate the runway momentarily, the operator is able to return to the exact last location and pass immediately upon return. In an embodiment, a GNSS receiver is coupled to a NAV-900 guidance controller. The touch screen, iPad or the like, is mounted in the cab of the truck and allows the operator to draw on the screen the area where rubber removal will be performed. Then, as the operator approaches that area, the operator is able to touch a button that auto controls the steering of the vehicle in alignment with the first pass. Again, if the operator is interrupted in the middle of that pass, a different shading of color makes it easy to identify which area the operator has covered already and where the operator needs to pick up on when the operator returns to the runway. At the end of each linear pass down the airfield, the operator will need to briefly shut off the high-pressure system and turn the truck around. Once the operator is turned around and headed back for the next pass, the auto pilot takes over and controls the linear overlap down the airfield to less than 25 mm. The approach is to reduce slightly the nozzle size located in the outer jets of the spray bars in that 25 mm area so that it is not hit 200%, but rather more on the order of 125%. The second thing that the GPS guidance system ensures that each time the vehicle is returned to the airfield for the next cleaning 3-4 months or 3-4 weeks later, the vehicle is offset from the overlapped area by beginning a first pass 75 mm's from where the prior cleaning started.

Now referring to the figures, FIG. 1 is a perspective view of GPS directed vehicle having a 1.5 meter ultra-high pressure washer for cleaning airport runway surfaces. A work vehicle 10 is shown having a frame 12 supported by wheels 14. The vehicle 10 is powered by an engine 16 attached to the frame 12 and connected to a driveline 18 for propelling the work vehicle 10. Operations and controls within the work vehicle 10 are located within a cab 20. High-pressure water is circulated throughout the system from a water tank 22 located above the frame 12 of the vehicle 10 and directed to a circular pressure washer 24 mounted to the frame 12 of the vehicle 10. The circular pressure washer 24 is equipped with at least one blasting head 26 which cleans the surface of the roadway with ultra-high pressure water between 20,000 psi and 40,000 psi. In a preferred embodiment, the circular pressure washer 24 is equipped with a 48", or nearly 1.3 meters, blasting head having a triple spray head and spaced 3 mm from each spray head.

The operator is able to control the speed of the truck using a throttle control and a brake module as well as steer the vehicle 10 with a steering wheel 15 around the runway surface. Once the area is cleared and the operator is able to safely clean a runway, the operator may steer the vehicle 10 to a position close to the area that is in need of cleaning. The operator then outlines with his finger on a computer 27 coupled to a positioning system displayed on a touchscreen display 28 the limits of rubber removal the operator intends to complete in that particular shift. A GPS receiver 30 with GNSS precision sits on top of the cab 20 and is calibrated so that it knows exactly where the blasting head 26 sits in relation to the GPS receiver 30. If the operator needs to stop during the pass, the computer 27 will capture interruption coordinates as a reference to return to at a later time. In a preferred embodiment, the computer 27 coupled to the positioning system will relocate the work vehicle 10 within 2 mm of a selected position providing autonomous direction control of the work vehicle 10.

Additionally, the computer 27 incorporates a speed control module which includes an algorithm for controlling the brake module to regulate the amount of drag on a brake to maintain a desired brake temperatures and air brake wear characteristics.

As the operator traverses along the path of travel 32, there is shading 34 that occurs on a recorded map 36 that indicates completion of a pass. If the operator must leave in the middle of the pass, the software and touchpad 28 will redirect the operator directly back to the exact position upon return. When the operator has completed with a pass, the operator takes over the steering manually and turns the truck around and positions it in rough proximity to the next pass. An auto feature re-engages the automatic steering and steers the vehicle 10 down the runway with a 25 mm or less controlled overlap.

The touchscreen display 28 allows the operator to input the width of the blasting head 26 to be used during the particular shift. The operator also inputs the number of millimeters or inches of overlap the operator would like to see as the vehicle 10 traverses down the runway, the preferred overlap is about 25 mm.

Figure 2:
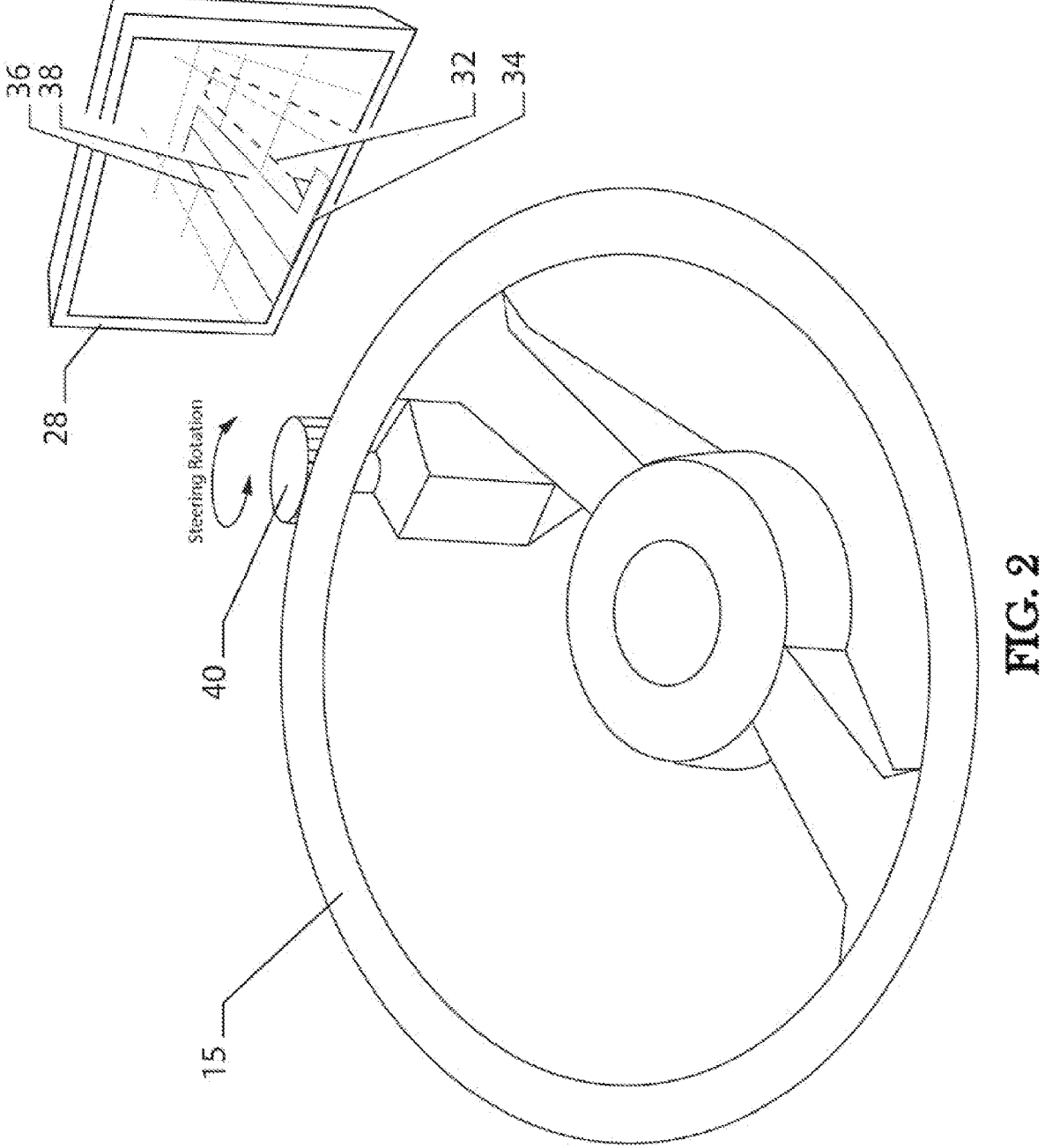
FIG. 2 is a pictorial view of a mapped surface of shaded area depicting cleaning with a steering wheel encoder.

FIG. 2 is a pictorial view of the touchscreen display 28 depicting a mapped surface 36 of shaded area depicting cleaning. The cleaned area 38 is stored in device wherein the next time the operator returns to that section of the runway, the operator will be equipped to begin the removal at a slightly different position laterally, maybe 50 or 75 mm away, so that the overlaps will not repeat themselves linearly down the runway which further minimizes any potential for overcleaning and the associated risks.

Also present in FIG. 2 is a pictorial view of a steering wheel encoder 40. The wheel equipped encoder 40 is spring loaded against the steering wheel 15 and coupled to an iPad or similar touchscreen display 28 to interface with the GPS receiver 30. The touchscreen display 28 displaying the position of the blasting head 26 and the associated posture of the wheels 14 that control the direction of the vehicle 10 in motion. The operator controls the speed of the vehicle 10, but upon approaching the outlined area 36 to be cleaned, the operator places the vehicle in automatic mode wherein the wheel equipped encoder 40 steers straight down the first path.

Figure 3:
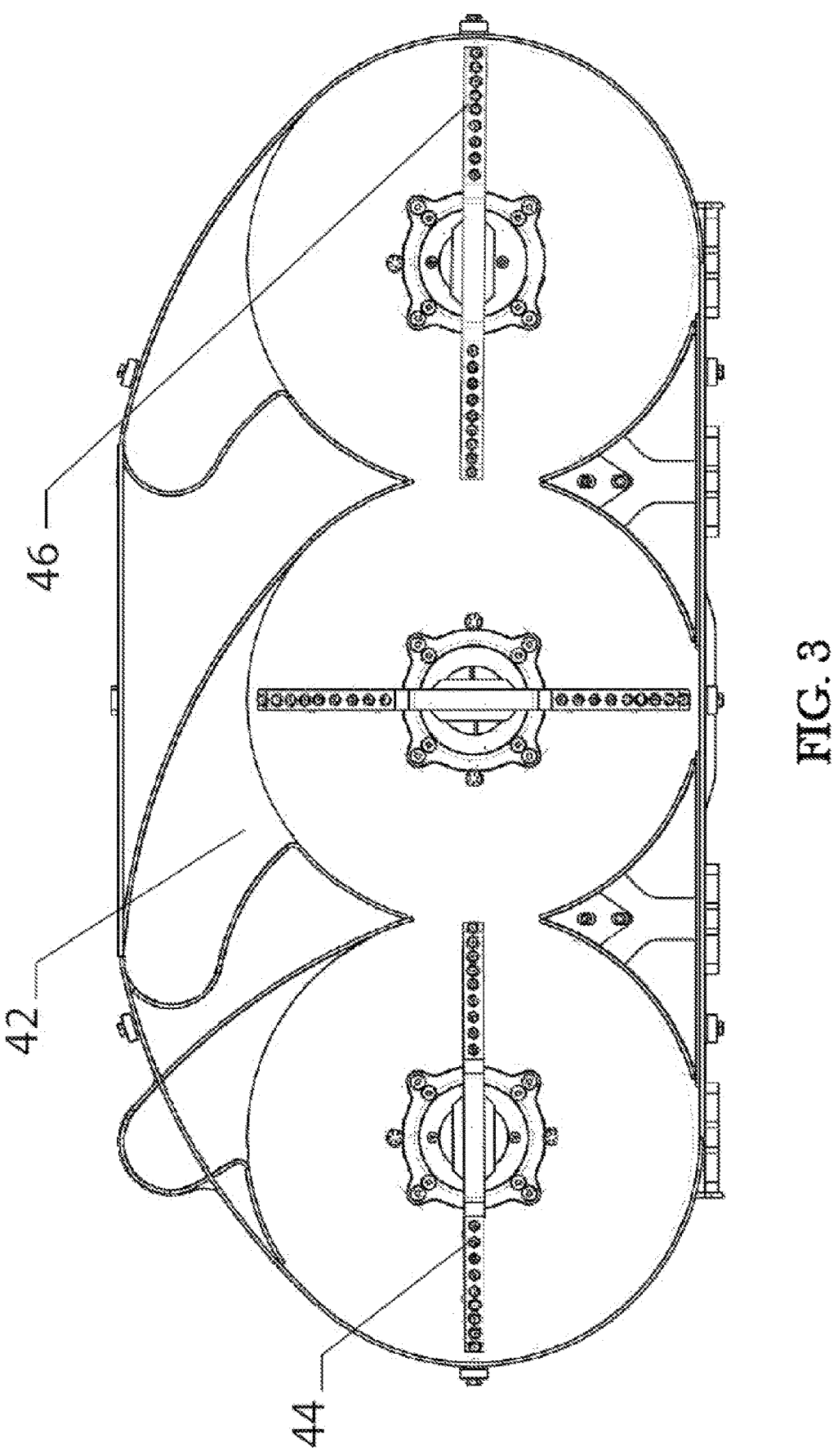
FIG. 3 is a pictorial view of the 48" blasting head.

FIG. 3 is a pictorial view of the 48" blasting head 26. To cover larger areas, a triple spray head 42 places three spray bars 44, directly in line with each other, there is no offset. The spray bars 44 pass approximately 3 mm from each other. The outside jets 46 on each of the bars are angled slightly so that they completely cover the area but do not overlap each other. This is a "zero overlap solution" that effectively covers 48 inches, or nearly 1.3 meters with zero overlap. The use of the triple spray bar solution is that all three spray bars 44 are rotated with one motor so it is impossible to spin them at different speeds.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A work vehicle used for cleaning airport runway surfaces, comprising:
   a frame supported by wheels;
   an engine attached to the frame and connected to a driveline for propelling the work vehicle;
   a steering wheel directional control;
   a speed control module for controlling a speed of the work vehicle;
   an encoder removably coupled to the steering wheel directional control;
   a global positioning system (GPS) guidance system;
   a screen;
   a computer coupled to the GPS guidance system and to the encoder, the computer being configured to convert calibrated location data onto a recorded map visible on the screen, the recorded map indicating a first area of an airport runway surface that has been cleaned and a second area of the airport runway surface to be cleaned; and
   an ultra-high pressure washer mounted to the frame, the ultra-high pressure washer including at least one blaster head for placement over a selected position on the airport runway surface,
   wherein the ultra-high pressure washer is configured to direct ultra-high pressure water towards the selected position for cleaning the airport runway surface; and
   wherein the computer is configured to cooperate with the GPS guidance system to return the work vehicle to the selected position to resume pressure cleaning at the selected position after the work vehicle has moved away from the selected position.

2. The work vehicle of claim 1, wherein the speed control module includes an algorithm for controlling a brake module to regulate an amount of drag on a brake to maintain a desired brake temperature and air brake wear characteristics.

3. The work vehicle of claim 1, wherein the computer is configured to cooperate with the GPS guidance system to return the work vehicle to the selected position with an overlap of about 25 millimeters after the work vehicle has moved away from the selected position.

4. The work vehicle of claim 1, wherein the at least one blaster head is constructed and arranged to clean a selectable width of the airport runway during a single pass.

5. The work vehicle of claim 1, wherein the at least one blaster head includes three is spray bars that are spaced from one another by about 3 millimeters.

6. A method for precise positioning of a work vehicle used for cleaning airport runway surfaces, comprising:
   mounting a global positioning system (GPS) guidance system to the work vehicle, the work vehicle having a frame supported by wheels with an engine attached to the frame and connected to a driveline for propelling the work vehicle together with a speed control module for controlling a speed of the work vehicle;
   attaching an encoder to a steering wheel directional control of the work vehicle for providing directional control of the work vehicle;
   coupling a computer to the GPS guidance system for receiving instructions to locate coordinates of the work vehicle, the computer being configured to convert calibrated location data onto a recorded map visible on a screen of the work vehicle, the recorded map indicating a first area of an airport runway surface that has been cleaned and a second area of the airport runway surface to be cleaned;
   installing an ultra-high pressure washer to the frame including at least one blaster head;
   positioning the at least one blaster head over a selected position, wherein pressurized water is directed from the at least one blaster head to the airport runway surface for removal of debris from the runway surface;
   directing the at least one blaster head to follow a predetermined path by receipt of computer instructions through autonomous direction control of the work vehicle;
   displaying the path and coordinates of the at least one blaster head;
   capturing interruption coordinates before the at least one blaster head is removed from the predetermined path;
   using the computer and the GPS guidance system to return the at least one blaster head to the interruption coordinates after the at least one blaster head is removed from the predetermined path; and, thereafter resume autonomous directional control of the work vehicle to continue cleaning along the predetermined path.

7. The method of claim 6, wherein the at least one blaster head is returned to a position within 2 millimeters of the interruption coordinates.

8. The method of claim 6, wherein an overlap of the interruption coordinates is programmed in the computer, and wherein the overlap does not exceed 25 millimeters.

9. The method of claim 6, wherein the screen is a touchscreen.

* * * * *